United States Patent
Moulsley et al.

(10) Patent No.: US 8,842,768 B2
(45) Date of Patent: Sep. 23, 2014

(54) RADIO COMMUNICATION SYSTEM, A RADIO STATION, AND METHOD OF TRANSMITTING DATA

(75) Inventors: Timothy J. Moulsley, Caterham (GB); Matthew P. J. Baker, Canterbury (GB)

(73) Assignee: Koninklijke Philips N.V., Eindhoven (NL)

( * ) Notice: Subject to any disclaimer, the term of this patent is extended or adjusted under 35 U.S.C. 154(b) by 1472 days.

(21) Appl. No.: 11/575,319

(22) PCT Filed: Sep. 15, 2005

(86) PCT No.: PCT/IB2005/053032
§ 371 (c)(1),
(2), (4) Date: Mar. 15, 2007

(87) PCT Pub. No.: WO2006/033059
PCT Pub. Date: Mar. 30, 2006

(65) Prior Publication Data
US 2008/0317159 A1 Dec. 25, 2008

(30) Foreign Application Priority Data
Sep. 20, 2004 (GB) .................................. 0420847.6

(51) Int. Cl.
H04L 27/00 (2006.01)
H03C 1/52 (2006.01)
H04W 52/32 (2009.01)
H04W 52/12 (2009.01)
H04L 25/02 (2006.01)
H04W 52/16 (2009.01)
H04W 52/44 (2009.01)
H04W 52/26 (2009.01)

(52) U.S. Cl.
CPC ............ *H04W 52/325* (2013.01); *H04W 52/12* (2013.01); *H04L 27/0008* (2013.01); *H04L 25/0224* (2013.01); *H04W 52/16* (2013.01); *H04W 52/44* (2013.01); *H04W 52/267* (2013.01)
USPC ............ 375/295; 375/300; 375/309; 375/302

(58) Field of Classification Search
USPC ......... 375/211, 219, 222, 295, 297, 316, 318, 375/317, 345, 344, 339, 358, 354, 220, 300, 375/299, 298, 302, 304, 309, 315, 320, 324, 375/322, 329, 334, 340
See application file for complete search history.

(56) References Cited

U.S. PATENT DOCUMENTS

| 6,748,222 | B1 * | 6/2004 | Hashem et al. | 455/453 |
| 2001/0034236 | A1 * | 10/2001 | Tong et al. | 455/450 |
| 2003/0112880 | A1 * | 6/2003 | Walton et al. | 375/260 |

(Continued)

FOREIGN PATENT DOCUMENTS

| EP | 1039654 A2 | 9/2000 |
| EP | 1039657 A1 | 9/2000 |

(Continued)

*Primary Examiner* — Sam K Ahn
*Assistant Examiner* — Linda Wong

(57) ABSTRACT

A radio communication system has a plurality of transmission formats available for transmitting data signals, and a pilot signal is transmitted during the transmission of data to enable channel estimation. The transmit power of the pilot signal is varied depending on the current transmission format of the data, and is reduced in the periods between data transmissions.

14 Claims, 3 Drawing Sheets

(56) References Cited

U.S. PATENT DOCUMENTS

| | | | |
|---|---|---|---|
| 2003/0224836 A1* | 12/2003 | Tsai et al. | 455/573 |
| 2004/0184553 A1* | 9/2004 | Hottinen | 375/264 |
| 2004/0208260 A1* | 10/2004 | Chan et al. | 375/297 |
| 2004/0258024 A1* | 12/2004 | Tiedemann et al. | 370/332 |
| 2005/0025109 A1* | 2/2005 | Ratasuk et al. | 370/342 |
| 2005/0118959 A1* | 6/2005 | Johan et al. | 455/67.11 |
| 2008/0039107 A1* | 2/2008 | Ma et al. | 455/450 |
| 2012/0120940 A1 | 5/2012 | Pi et al. | |

FOREIGN PATENT DOCUMENTS

| | | |
|---|---|---|
| JP | 2001308723 A | 11/2001 |
| WO | 0205757 A1 | 1/2002 |
| WO | 03105381 A2 | 12/2003 |

\* cited by examiner

RADIO COMMUNICATION SYSTEM, A RADIO STATION, AND METHOD OF TRANSMITTING DATA

The invention relates to a radio communication system, a radio station and a method of transmitting data, in particular where, in addition to transmitting a data signal, a pilot signal is transmitted to enable a receiving station to perform channel estimation.

It is known to transmit a pilot signal in addition to a data signal to enable a receiving station to perform channel estimation. Such a technique is used, for example, in mobile communications systems such as GSM and the Universal Mobile Telecommunication System (UMTS). The data signal comprises arbitrary symbols according to the information to be conveyed, and the pilot signal comprises pre-determined symbols. The channel estimation can take different forms, for example an estimation of propagation loss, enabling the receiving station to generate and transmit power control (TPC) commands to control the transmit power of the sending station, generally known as closed loop power control, or an estimation of multipath propagation, enabling the receiving station to apply equalisation to compensate for the effects of multipath propagation. Also, the pilot symbols may be used by the receiving station to generate a phase reference for use in demodulating the data symbols. In the present specification the terms "sending station" and "receiving station" refer to, respectively, the station that transmits the data signal and pilot signal and the station that receives the data signal and pilot signal. The sending station and receiving station are also referred to respectively as the "first station" and the "second station".

In closed loop power control schemes, such as employed in UMTS, the receiving station performs channel estimation on a received signal by measuring a parameter of the signal that is indicative of signal quality, such as signal-to-interference ratio (SIR) or signal-to-noise ratio (SNR), and comparing the measured value with a target value of the parameter. The result of the comparison is used to generate a TPC command, which is a command to either to increase or decrease transmit power by a specific amount in order to drive the measured parameter towards the target value. In some schemes the TPC command may indicate that no change in transmit power level is required.

The TPC commands transmitted by the receiving station are used by the sending station to control the transmit power of both the pilot signal and the data signal. The transmit power level of the pilot signal need not be identical to the transmit power level of the data signal, but there may be an offset between these two levels, the offset being maintained at a defined ratio as the levels are varied in accordance with the received TPC commands. This offset ratio is selected to apportion the transmit power between the pilot signal and the data signal in an efficient manner, for example, to balance the accuracy of channel estimation with the reliability of data demodulation, while avoiding the generation of unnecessary interference.

An outer loop power control procedure may be used to adjust the target value of the measured parameter in such a way that the data signals are received with sufficient reliability.

Data may be transmitted using different transmission formats, with a transmission format being selected to suit the priority and target reliability of the data and the prevailing conditions such as signal level and channel loading. A transmission format is a combination of one or more parameters such as: modulation method, symbol rate, bit rate, channel coding rate, transmit power level, source coding scheme, or spreading factor. Furthermore, the value of the offset ratio may be selected dependent on the transmission format. In this case the offset is maintained at the selected ratio as the power levels of the pilot signal and data signal are varied in accordance with the received TPC commands.

There is a requirement for transmitting data discontinuously, for example transmitting data in data packets intermittently at a high bit rate with gaps between data packets where transmission of the data signal ceases. Such gaps can disrupt closed loop power control if applied also to the pilot signal, so one way of operating is to transmit a continuous pilot signal and a discontinuous data signal.

An object of the invention is to enable efficient use of transmit power.

According to a first aspect of the invention there is provided a method of transmitting data from a first station to a second station, comprising, at the first station:
transmitting a data signal in at least a selected one of a plurality of transmission formats, wherein the transmission of the data signal is discontinuous; and
transmitting a pilot signal for channel estimation by the second station, wherein the pilot signal is transmitted during transmission of the data signal and during at least some of the time while transmission of the data signal is discontinued; and
temporarily increasing, during at least some of the transmission of the data signal, the transmit power level of the pilot signal by an amount dependent on the current transmission format of the data signal.

According to a second aspect of the invention there is provided a radio station for transmitting a data signal to a second station, the radio station comprising:
means for transmitting a data signal discontinuously in at least a selected one of a plurality of transmission formats;
means for transmitting a pilot signal for channel estimation by the second station, during transmission of the data signal and during at least some of the time while transmission of the data signal is discontinued; and
means for temporarily increasing, during at least some of the transmission of the data signal, the transmit power level of the pilot signal by an amount dependent on the current transmission format of the data signal.

According to a third aspect of the invention there is provided a radio station comprising:
means for receiving a data signal transmitted discontinuously in at least a selected one of a plurality of transmission formats;
means for receiving a pilot signal transmitted during transmission of the data signal and during at least some of the time while transmission of the data signal is discontinued;
means for measuring a parameter of the received pilot signal;
means for comparing a measured value of the parameter with a target value of the parameter;
means for generating transmit power control commands in response to the comparison;
means for transmitting the transmit power control commands; and
means for adjusting the target value during reception of the data signal by an amount dependent on the transmission format of the data signal.

According to a third aspect of the invention there is provided a radio communication system comprising a first station and a second station, the first station comprising:
means for transmitting a data signal discontinuously in at least a selected one of a plurality of transmission, formats;
means for transmitting a pilot signal for channel estimation by the second station, during transmission of the data signal and during at least some of the time while transmission of the data signal is discontinued; and means for temporarily increasing, during at least some of the transmission of the data signal, the transmit power level of the pilot signal by an amount dependent on the current transmission format of the data signal; and the second station comprising:

means for receiving the pilot signal and data signal;
means for performing channel estimation on the pilot signal; and
means for demodulating the data signal.

The invention enables the transmit power of the pilot signal during data transmission to be minimised for each data transmission format while remaining high enough for accurate channel estimation, and enables the transmit power of the pilot signal to be reduced between data transmissions to reduce the average interference generated.

The invention will now be described, by way of example only, with reference to the accompanying drawings wherein.

Figure 1:
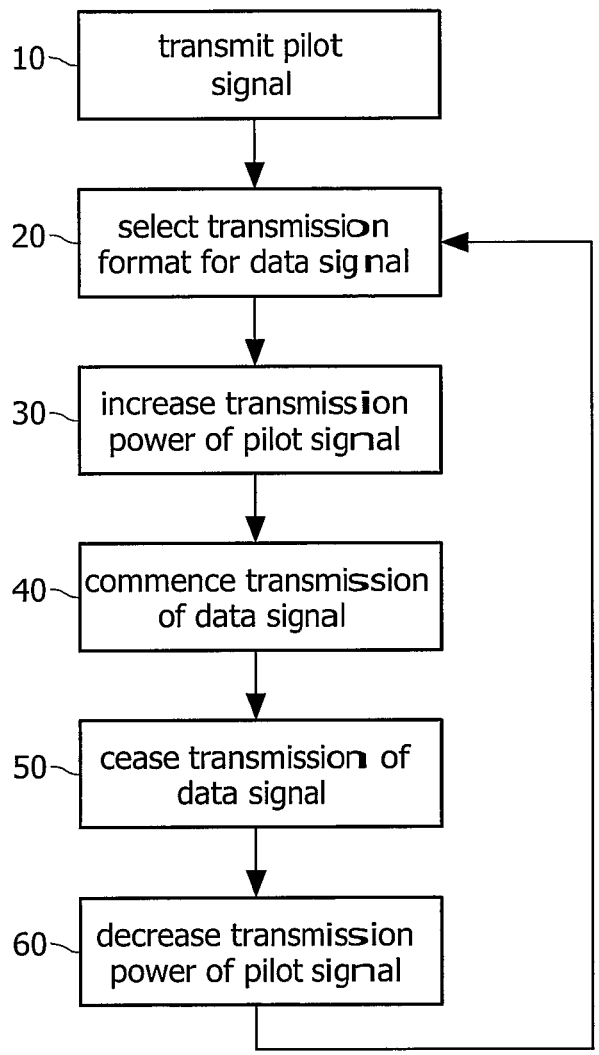
FIG. 1 is a flow chart of a method of transmitting data in accordance with the invention.

Referring to FIG. 1, at step 10 the sending station commences transmission of a pilot signal; the transmission continues throughout the remaining steps of the flow chart. At step 20 a transmission format is selected for the transmission of a data signal. At step 30 the transmission power of the pilot signal is increased by an amount that is dependent on the selected transmission format. At step 40 transmission of the data signal commences in the selected transmission format. At step 50 transmission of the data signal ceases, for example after transmission of one or more data packets. At step 60 the transmission power of the pilot signal is decreased by an amount that is dependent on the selected transmission format.

The increase and decrease at respectively steps 30 and 60 are nominally by equal amounts, such that the transmission power after the decrease is nominally equal to the transmission power before the increase. However, closed loop transmit power control may also be in operation whereby the receiving station performs channel estimation on the received pilot signal and transmits to the sending station transmit power control (TPC) commands. The sending station receives the TPC commands and adjust its transmit power in response to these TPC commands. When closed loop transmit power control is in operation the increase and decrease at respectively steps 30 and 60 may differ by an amount dependent on the balance of any TPC commands between these steps.

The process loops back to step 20 for the next transmission of data signal.

The transmission format may be chosen by the sending station, or chosen by the receiving station and notified to the sending station. This latter case may occur, for example, if the sending station is a mobile station and the receiving station is a base station choosing the transmission formats, and scheduling the times, of data signal transmissions by mobile stations.

Figure 2:
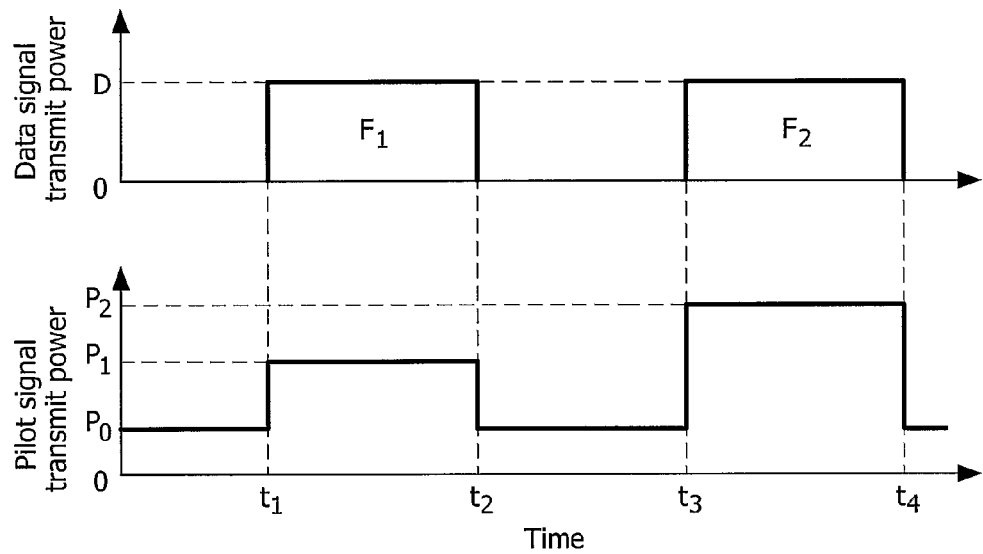
FIG. 2 is a graph illustrating the transmit power level of a pilot signal and data signal for one embodiment of the invention.

Referring to FIG. 2, there is illustrated two periods of transmission of data signal; between time $t_1$ to $t_2$ the data signal is transmitted using a transmission format $F_1$, and between time $t_3$ to 4 the data signal is transmitted using a transmission format $F_2$, both transmissions being at the same power level D, and with the transmission of the data signal ceasing outside of these times. Format $F_2$ may use, for example, a higher bit rate than format $F_1$. Also in FIG. 2 is illustrated the transmission of the pilot signal, at a level $P_0$ while transmission of the data signal is discontinued, and at levels $P_1$ and $P_2$ during, respectively, transmission of the data signal using transmission format $F_1$ and $F_2$. The offset ratio is $D/P_1$ during the time period $t_1$ to $t_2$, and $D/P_2$ during the time period $t_3$ to 4. The power level $P_2$ is higher that $P_1$ in order to increase the accuracy of channel estimation during the higher bit rate format $F_2$; such an increase in pilot signal power operates to compensate for a reduced reliability of the higher bit rate data signal. The changes in power level of the pilot signal are illustrated as occurring at the same times as the commencement and cessation of transmission of the data signal; in practice the changes need not occur at the same times, although preferably the transmit power of the pilot signal is increased for the whole of each period during which the data signal is transmitted.

Figure 3:
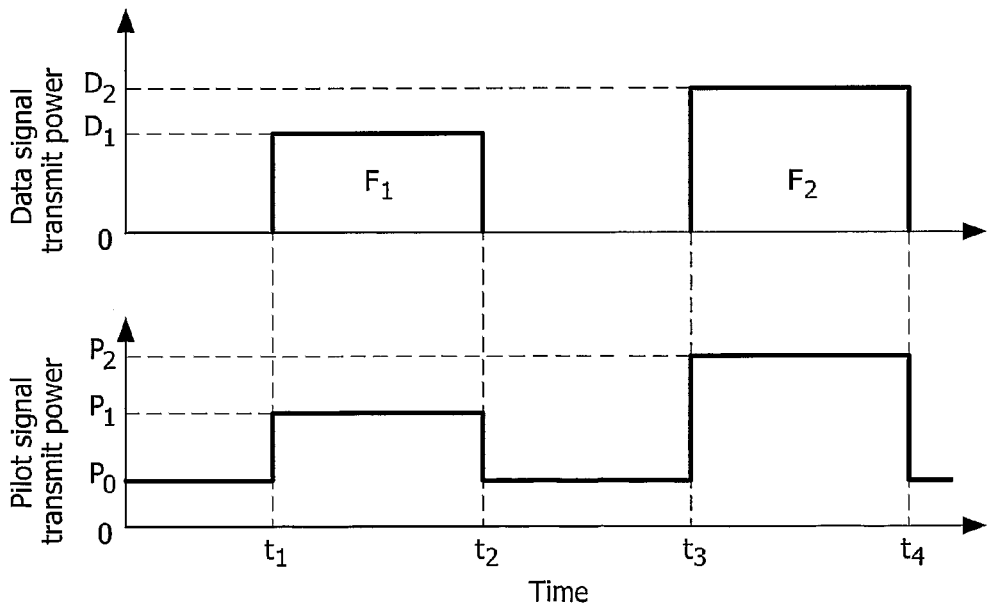
FIG. 3 is a graph illustrating the transmit power level of a pilot signal and data signal for a second embodiment of the invention.

FIG. 3 illustrates another example of transmit power levels. FIG. 3 is identical to FIG. 2, except that transmission of the data signal using transmission format $F_1$ is at power level $D_1$ and transmission of the data signal using transmission format $F_2$ is at a higher power level $D_2$. The offset ratio is $D_1/P_1$ during the time period $t_1$ to $t_2$, and $D_2/P_2$ during the time period $t_3$ to $t_4$. The increase in data signal power from $D_1$ to $D_2$, and the increase in pilot signal power from $P_1$ to $P_2$, both operates to compensate for a reduced reliability of the higher bit rate data signal of transmission format $F_2$.

If the receiving station generates TPC commands for transmission to the sending station for the purpose of closed loop transmit power control, by comparison of a measured parameter of the received signal with a target value, during the temporary increase in the transmit power level of the pilot signal the target value may be adjusted by an amount dependent on the transmission format of the data signal.

The magnitude of the temporary increase of transmit power level of the pilot signal may be selected by the receiving station and an indication of the magnitude transmitted to the sending station. This latter case may occur, for example, if the receiving station is a base station and the sending station is a mobile station.

Figure 4:
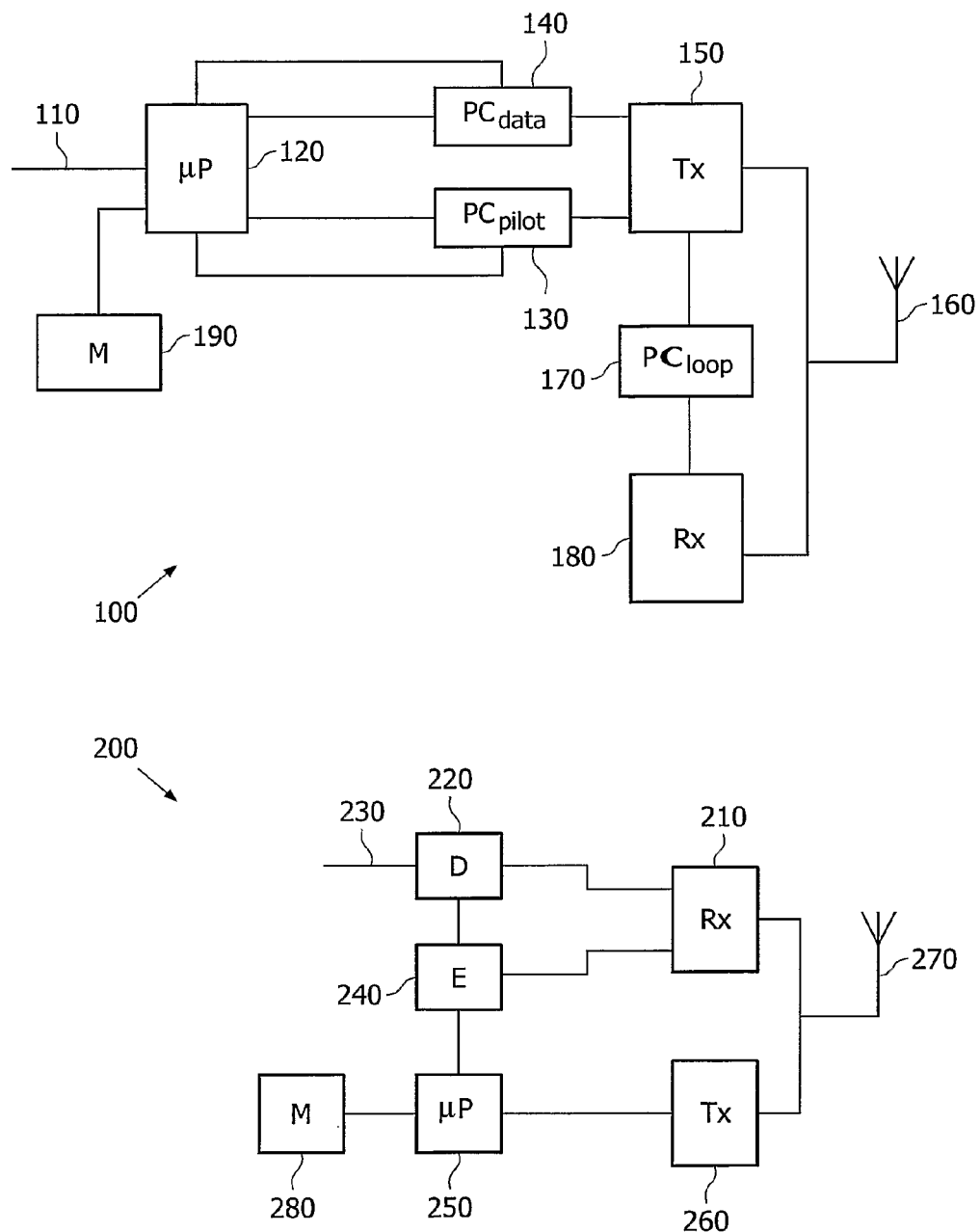
FIG. 4 is a block schematic diagram of a radio communication system.

Referring to FIG. 4, there is illustrated a block schematic diagram of a radio communication system comprising a sending station 100 and a receiving station 200. For example, the sending station 100 may be a mobile apparatus and the receiving station 200 may comprise fixed equipment of a mobile communication network.

The sending station 100 comprises a processing means (µP) 120 coupled to an input 110 for receiving data to be transmitted in a data signal, and coupled to a memory (M) 190 for storing parameters of available transmission formats. The set of available transmission formats may be determined by the receiving station 200 and signalled to the sending station 100.

The format for a data transmission may be selected by the sending station 100, or by the receiving station 200 and signalled to the sending station 100, considering the amount of data available to transmit, and the amount of power available for transmission.

The processing means (µP) 120 is adapted to select from the memory 190 the parameters for one of a plurality of transmission formats for transmission of the data and to encode the data for transmission, which may include subdividing the data into a plurality of data packets. The processing means (µP) 120 is coupled to a transmitter (Tx) 150 for transmission of the data signal via an antenna 160. The transmission of the data signal is discontinuous because, for example, the arrival of data at the input 110 is discontinuous, or because the sending station 100 is granted permission to transmit data only during discontinuous time periods. Optionally, the data signal for transmission is supplied to the transmitter from the processing means (µP) 120 via a data signal power controller ($PC_{data}$) 140 which is coupled to the processing means (µP) 120 for controlling the transmit power level of the data signal dependent on the transmission format, according to parameters stored in the memory 190. In the scenario of FIG. 2, an indication of the offset ratio $D/P_1$ is stored in the memory 190, the same offset ratio being applicable for both transmission format $F_1$ and $F_2$, and in the scenario of FIG. 3 an indication of the offset ratios $D_1/P_1$ and $D_2/P_2$ is stored for use with, respectively, transmission format $F_1$ and $F_2$.

The processing means (µP) 120 is also adapted to generate a pilot signal comprising pre-determined pilot symbols suitable for channel estimation by the receiving station and is coupled via a pilot signal power controller ($PC_{pilot}$) 130 to the transmitter for transmission of the pilot signal. The pilot signal is transmitted during at least some of the time while the data signal is being transmitted, and preferably continuously throughout transmission of the data signal, and during at least some of the time while transmission of the data signal is discontinued. The pilot signal power controller 130 is coupled to the processing means (µP) 120 for controlling the transmit power level of the pilot signal dependent on the transmission format of the data signal, according to parameters stored in the memory 190, and for controlling the transmit power level $P_0$ of the pilot signal while transmission of the data signal is discontinued. In the scenarios of FIGS. 2 and 3, an indication of the power levels $P_0$, $P_1$ and $P_2$ is stored in the memory 190.

Optionally the sending station 100 may comprise a receiver (Rx) 180 coupled to the antenna 160 for receiving TPC commands transmitted by the receiving station 200 for the purpose of closed loop transmit power control, and a loop power controller ($PC_{loop}$) 170 coupled to the receiver 180 for decoding the received TPC commands and coupled to the transmitter 150 for adjusting the transmit power level of the pilot signal and the data signal in accordance with the received TPC commands. The closed loop transmit power control is superimposed on the changes in transmit power level introduced by the pilot signal power controller ($PC_{pilot}$) 130 and by the data signal power controller ($PC_{data}$) 140.

The receiving station 200 comprises a receiver (Rx) 210 coupled to an antenna 270 for receiving the pilot signal and data signal transmitted by the sending station 100. Coupled to the receiver 210 is a data demodulator (D) 220 for demodulating the received data signal and delivering the demodulated data on an output 230.

Coupled to the receiver 210 is an estimation means (E) 240 for performing channel estimation on the received pilot signal symbols. An output of the estimation means 240 may be coupled to the data demodulator 220 to enable the result of channel estimation to be used in demodulating the data, for example, to enable the data demodulator 220 to generate a phase reference or to perform equalisation.

The receiving station 200 comprises a processing means (µP) 250 which may be coupled to an output of the estimation means 240 for generating TPC commands from the result of channel estimation, and is coupled to a transmitter (Tx) 260 for transmitting the TPC commands to the first station 100 via the antenna 270. In order to generate TPC commands, the estimation means 240 measures a parameter of the received pilot signal, for example SIR or SNR, and compares the value of the measured parameter with a target value. When the transmit power level of the pilot signal is temporarily increased by the sending station 100 by an amount dependent on the transmission format of the data signal, without further measures at the receiving station 200 the TPC commands would tend to restore the transmit power level of the sending station 100. Therefore, the receiving station 200, under the control of the processing means 250, also temporarily increases the target value of the measured parameter by an amount dependent on the transmission format of the data signal for the period during which the transmit power level of the pilot signal is temporarily increased. For this purpose, the processing means 250 of the receiving station is coupled to a memory 280 for storage of indications of target values of the estimated channel parameters for each of the available transmission formats of the data signal.

Optionally the values of any, or all, of the indications stored in the memory 190 of the sending station may be changed under the control of the receiving station. In this case the these indications, and these indications may be transmitted to the sending station 100 via the transmitter 260.

Optionally transmission of the pilot signal may be interrupted temporarily during transmission of the data signal.

In the present specification and claims the word "a" or "an" preceding an element does not exclude the presence of a plurality of such elements. Further, the word "comprising" does not exclude the presence of other elements or steps than those listed. The inclusion of reference signs in parentheses in the claims is intended to aid understanding and is not intended to be limiting. From reading the present disclosure, other modifications will be apparent to persons skilled in the art. Such modifications may involve other features which are already known in the art of radio communications and which may be used instead of or in addition to features already described herein.

The invention claimed is:

1. A method of transmitting data from a first station to a second station, comprising, at the first station:
    transmitting from the first station in a first time period, a data signal in a first transmission format selected from among a plurality of transmission formats, wherein the transmission of the data signal is discontinuous;
    transmitting from the first station in said first time period, a pilot signal for channel estimation by the second station, wherein the pilot signal is transmitted during transmission of the data signal in said first time period and during at least some of the time while transmission of the data signal is discontinued;
    transmitting from the first station in a second time period, a data signal in a second transmission format selected from among said plurality of transmission formats, wherein the transmission of the data signal is discontinuous and the second transmission format is a higher bit rate format than the first transmission format;
    transmitting from the first station in said second time period, a pilot signal for channel estimation by the second station at a power level that is higher than a power level used to transmit the pilot signal in said first time period, wherein said higher power level of the pilot signal is responsively selected by the first station to compensate for a reduced reliability of transmitting the higher bit rate transmission format of the data signal in said second time period, and wherein the pilot signal is transmitted during transmission of the data signal during said second time period and during at least some of the time while transmission of the data signal is discontinued.

2. A method as claimed in claim 1, comprising transmitting the data signal at a power level which is dependent on the transmission format of the data signal.

3. A method as claimed in claim 2, comprising maintaining the ratio of the power level of the data signal relative to the power level of the pilot signal at a value dependent on the transmission format of the data signal.

4. A method as claimed in claim 1, comprising adjusting the transmit power level of the data signal and of the pilot signal in accordance with closed loop power control commands transmitted from the second station to the first station and adjusting, during the temporary increase in the transmit power level of the pilot signal, a target value of the closed loop by an amount dependent on the transmission format of the data signal.

5. A method as claimed in claim 1, comprising transmitting from the second station to the first station an indication of the magnitude of the temporary increase.

6. A radio station for transmitting a data signal to a second station, the radio station comprising:
a transmitter of the radio station transmitting, in a first time period, a data signal discontinuously in a first transmission format selected from among a plurality of transmission formats;
said transmitter of the radio station transmitting, in said first time period, a pilot signal for channel estimation by the second station, during transmission of the data signal in said first time period and during at least some of the time while transmission of the data signal is discontinued;
said transmitter of the radio station transmitting, in a second time period, a data signal in a second transmission format selected from among said plurality of transmission formats, wherein the transmission of the data signal is discontinuous and the second transmission format is a higher bit rate format than the first transmission format;
said transmitter of the radio station transmitting, in said second time period, a pilot signal for channel estimation by the second station at a power level that is higher than a power level used to transmit the pilot signal in said first time period, wherein said higher power level is responsively selected by the radio station to compensate for a reduced reliability of transmitting the higher bit rate transmission format of the data signal in said second time period, and wherein the pilot signal is transmitted during transmission of the data signal during said second time period and during at least some of the time while transmission of the data signal is discontinued.

7. A radio station as claimed in claim 6, comprising means for selecting a transmit power level for the data signal dependent on the transmission format of the data signal.

8. A radio station as claimed in claim 7, comprising means for maintaining the ratio of the power level of the data signal relative to the power level of the pilot signal at a value dependent on the transmission format of the data signal.

9. A radio station comprising:
processing means for receiving a data signal transmitted discontinuously in at least a selected one of a plurality of transmission formats;
a receiver for receiving a pilot signal transmitted during transmission of the data signal and during at least some of the time while transmission of the data signal is discontinued, wherein a power level of the received pilot signal compensates for a reduced reliability of receiving said data signal at a higher bit rate in at least one of said plurality of transmission formats relative to at least one other of said plurality of transmission formats;
a channel estimator for measuring a parameter of the received pilot signal;
said channel estimator for comparing a measured value of the parameter with a target value of the parameter;
said processing means for generating transmit power control commands to adjust the transmit power level of the data signal and the pilot signal in response to the comparison;
a transmitter for transmitting the transmit power control commands; and
said processing means for adjusting the target value of the parameter of the received pilot signal during reception of the data signal by an amount dependent on the transmission format of the data signal.

10. A radio communication system comprising
a first station and a second station,
a transmitter, associated with the first station, transmitting, in a first time period, a data signal discontinuously in a first transmission format selected from among a plurality of transmission formats;
the transmitter of the first station transmitting, in said first time period, a pilot signal for channel estimation by the second station, during transmission of the data signal in said first time period and during at least some of the time while transmission of the data signal is discontinued;
the transmitter of the first station transmitting, in a second time period, a data signal in a second transmission format selected from among said plurality of transmission formats, wherein the transmission of the data signal is discontinuous and the second transmission format is a higher bit rate format than the first transmission format;
the transmitter of the first station transmitting, in said second time period, a pilot signal for channel estimation by the second station at a power level that is higher than a power level used to transmit the pilot signal in said first time period wherein said higher power level is responsively selected by the first station to compensate for a reduced reliability of transmitting said higher bit rate transmission format of the data signal in said second time period, and
wherein the pilot signal is transmitted during transmission of the data signal during said second time period and during at least some of the time while transmission of the data signal is discontinued and
the second station comprising:
a receiver receiving at the second station the pilot signal and data signal, wherein a power level of the pilot signal compensates for a reduced reliability of receiving said data signal at a higher bit rate in at least one of said plurality of transmission format relative to at least one other of said plurality of transmission formats;
a channel estimator performing, at the second station, channel estimation on the pilot signal; and
a demodulator demodulating the data signal at the second station.

11. A radio communication system as claimed in claim 10, the first station further comprising means for selecting a transmit power level for the data signal dependent on the selected transmission format.

12. A radio communication system as claimed in claim 11, comprising means for maintaining the ratio of the power level of the data signal relative to the power level of the pilot signal at a value dependent on the transmission format of the data signal.

13. A radio communication system as claimed in claim 10, wherein the means for performing channel estimation is
- adapted to measure a parameter of the received pilot signal; and the second station further comprising:
- a channel estimator configured to comparing a measured value of the parameter with a target value of the parameter;
- a processor for generating transmit power control commands in response to the comparison;
- a transmitter configured to transmit the transmit power control commands; and
- means for adjusting the target value during reception of the data signal by an amount dependent on the transmission format of the data signal; and the first station comprising:
- a receiver configured to receive the transmit power control command; and said processor means for adjusting the transmit power level of the pilot signal and the data signal in accordance with the transmit power control command, wherein the transmit power level of the power signal compensates for a reduced reliability of receiving the data signal at a higher bit rate in a transmission format transmitting at a higher bit rate relative to other transmission formats transmitting at relatively lower bit rates.

14. A radio communication system as claimed in claim 10, the second station further comprising means for transmitting to the first station an indication of the magnitude of the temporary increase.

* * * * *